(No Model.)
D. W. UMSTEAD.
GUIDE FOR PISTON RODS.
No. 405,511. Patented June 18, 1889.
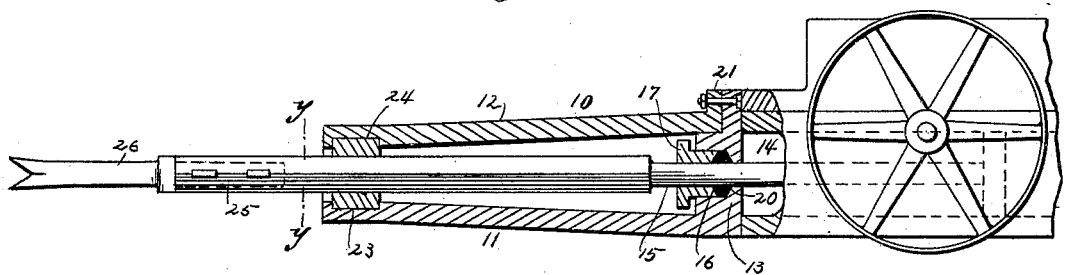
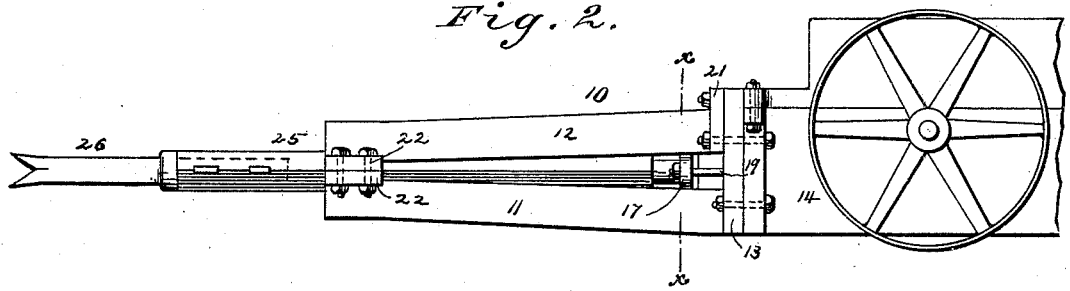
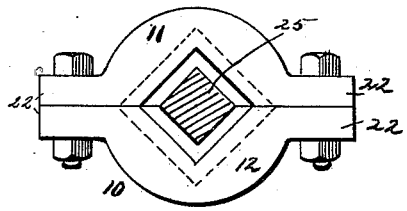
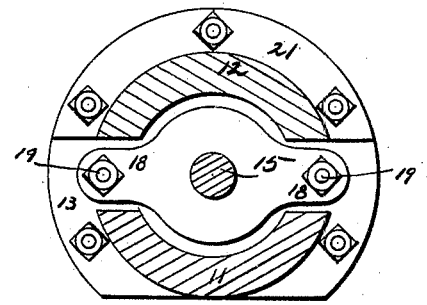
WITNESSES:
INVENTOR:
D. W. Umstead
BY Munn & Co.
ATTORNEYS.

UNITED STATES PATENT OFFICE.

DANIEL W. UMSTEAD, OF EARLINGTON, KENTUCKY.

GUIDE FOR PISTON-RODS.

SPECIFICATION forming part of Letters Patent No. 405,511, dated June 18, 1889.

Application filed September 5, 1888. Serial No. 284,653. (No model.)

*To all whom it may concern:*

Be it known that I, DANIEL W. UMSTEAD, of Earlington, in the county of Hopkins and State of Kentucky, have invented a new and Improved Guide for Piston-Rods, of which the following is a full, clear, and exact description.

My invention relates to an improvement in guides for piston-rods, especially adapted for use, in connection with mining machinery, and has for its object to dispense with the crimp and crimp-plate usually employed to prevent the air from escaping around the piston-rod and sleeve-head or cylinder.

Another object of the invention is to provide a sectional bushing at the outer end of the sleeve, which may be conveniently and expeditiously inserted in the said sleeve and detached therefrom; and the further object of the invention is to construct the sleeve in two parts, or more, if desired, whereby the bushing is rendered readily accessible, and likewise the packing and glands of the sleeve.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a longitudinal section of the sleeve and a portion of the cylinder, illustrating the sleeve as attached to the cylinder. Fig. 2 is a side elevation of the sleeve and part of the cylinder. Fig. 3 is a transverse section on line $x$ $x$ of Fig. 2, and Fig. 4 is a transverse section on line $y$ $y$ of Fig. 1.

In carrying out the invention the sleeve 10 is preferably made to taper longitudinally or have an essentially conical contour, and constructed in two longitudinal sections 11 and 12. A disk 13 is cast integral with the lower section 11 at the enlarged end of the same, which disk is adapted to constitute the outer head of the cylinder 14. The disk 13 is provided with an aperture adapted to receive the piston-rod 15, and upon the inner face of the disk within the sleeve-section a stuffing-box 16 is constructed surrounding the said aperture, and in the said stuffing-box a gland 17 is inserted, the said gland being preferably held in position through the medium of ears 18, integral with opposite sides of the same, and bolts 19, passing through said gland into the disk or cylinder-head 13, as best illustrated in Figs. 2 and 3. The gland 17 is adapted to bear upon the packing 20, which may consist of hemp, wicking, or other equivalent or suitable material. The upper section 12 of the sleeve is provided upon the outer edge with a flange 21, adapted to be bolted to the disk or cylinder-head 13, and the inner surface of the said upper section at the enlarged end of the sleeve is supported upon the upper edge of the stuffing-box, as best illustrated in Fig. 1, and the outer or contracted ends of the sleeve-sections are provided with lugs 22, extending outward at a right angle thereto, which lugs are bolted together in any approved manner, as best shown in Figs. 2 and 4.

In the inner surface of the sleeve-sections, at or near the outer or contracted end, a recess 23 is produced, whereby, when the two sections are brought in contact one with the other, the said recess is continuous. The recess 23 is adapted for the reception of the bushing 24, the said bushing being constructed in two parts—namely, an upper and lower section, the lower edges of each section being in alignment with the under face of the lugs 22, as best shown in Fig. 4.

The complete bushing is provided with an essentially diamond-shaped aperture, instead of the circular aperture usually employed, and the outer end 25 of the piston-rod, which passes through and reciprocates in the said bushing, is also made essentially diamond-shaped in cross-section to correspond with the aperture in the bushing. By reason of the diamond-shaped aperture of the bushing and the equivalent contour of the piston-rod, the said rod is prevented from turning, whereby the pick 26, secured in the outer end of the said rod, may be more accurately and conveniently operated by the miner or other person. The peculiar formation of the piston-rod also protects the same against excessive wear.

It will be observed, by reason of the sleeve being made in two sections, that should the bushing become worn the same may be readily taken out and carried to a convenient place and dressed and again inserted, or an entire new bushing substituted, and, further, that without any difficulty the gland 17 may be removed and the stuffing 20 inspected and replaced, if desired.

Having thus described my invention, what I claim as new, and desire to secure by Letters Patent, is—

1. The combination, with a cylinder and a longitudinal sectional sleeve, of a cylinder-head forming an integral portion of the lower sleeve-section provided with a central aperture, a stuffing-box surrounding said aperture, a gland inserted in said stuffing-box, and a sectional bushing detachably secured in said sleeve at the end opposite to that carrying the cylinder-head, substantially as and for the purpose specified.

2. The combination, with a sleeve adapted for attachment to a cylinder and divided longitudinally in two sections, of a disk integral with one end provided with a central aperture adapted to receive a piston-rod, a stuffing-box surrounding the said aperture, a gland inserted in said stuffing-box, and a bushing detachably held in the opposite end of the sleeve divided into two sections and provided with an essentially diamond-shaped aperture, substantially as and for the purpose specified.

3. The combination, with a cylinder, a sleeve adapted for attachment thereto divided into two sections, and a disk integral with one section at one end forming a cylinder-head, provided with an aperture adapted to receive a piston-rod, of a stuffing-box surrounding the aperture in the disk, a gland inserted in said stuffing-box, a packing intervening the end of the gland and contiguous face of the stuffing-box, and a sectional bushing detachably held in the opposite end of the said sleeve provided with an essentially diamond-shaped aperture, as and for the purpose specified.

4. The combination, with a cylinder, a sleeve adapted for attachment thereto divided into two sections, and a disk integral with one section, at one end forming a cylinder-head, provided with an aperture adapted to receive a piston-rod, of a stuffing-box surrounding the aperture in the disk, a gland inserted in said stuffing-box, a packing intervening the end of the gland and contiguous face of the stuffing-box, a sectional bushing detachably held in the opposite end of the said sleeve provided with an essentially diamond-shaped aperture, and a piston-rod circular in cross-section at one end and essentially diamond-shaped in cross-section at the other end reciprocating in the said sleeve, substantially as and for the purpose specified.

DANIEL W. UMSTEAD.

Witnesses:
GEO. C. ATKINSON,
HARRY S. COREY.